ated Jan. 14, 1964

3,117,994
N,N',N''-TRISUBSTITUTED GUANIDINES

Arthur F. McKay, Beaconsfield, Quebec, and David L. Garmaise, Montreal, Quebec, Canada, assignors to Monsanto Canada Limited, Quebec, Canada
No Drawing. Filed Nov. 7, 1960, Ser. No. 67,498
Claims priority, application Great Britain Dec. 3, 1959
10 Claims. (Cl. 260—564)

This invention relates to guanidine derivatives and more particularly to trisubstituted guanidines and their salts, to the production thereof and to bacteriostatic compositions containing them.

In accordance with this invention there are provided trisubstituted guanidines of the general formula:

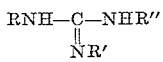

wherein R'' is one of a group consisting of straight chain alkyl group having from 1 to 12 carbon atoms, 2-hydroxyethyl, 2-dimethylaminoethyl, 2-phenylethyl, 2-pyridylmethyl, 3-pyridylmethyl, α-naphthylmethyl, allyl, benzyl, 3,4-dichlorobenzyl, 4-isopropylbenzyl, 2,4,5-trimethylbenzyl when R and R' are 3,4-dichlorobenzyl' n-butyl when R and R' are 3,4-dimethylbenzyl; 4-methylbenzyl, 3,4-dimethylbenzyl, β-(3,4-dichlorophenyl)-ethyl when R and R' are the same as R''; benzyl, 3-nitrobenzyl when R is 3,4-dichlorobenzyl and R' is benzyl; and α-naphthylmethyl when R is 3,4-dichlorobenzyl and R' is α-naphthylmethyl.

The guanidine compounds of the foregoing general formula have been found to be unexpectedly potent bacteriostats effective on gram-negative as well as gram-positive organisms. For example, N-benzyl-N',N''-di-(3,4-dichlorobenzyl)-guanidine hydrochloride inhibited the growth of the following organisms at the dilutions indicated: Staph. pyogenes (penicillin sensitive) (1:5,120,000), Staph. pyogenes (penicillin resistant) (1:2,560,000), Sarcina lutea (1:5,120,000), Strept. faecalis (1:1,640,000), E. coli No. 198 (1:640,000), Aero. aerogenes (1:160,000), S. pullorum (1:160,000), Ps. aeruginosa (1:160,000), Pr. mirabilis (1:80,000), and Pr. vulgaris (1:80,000).

In another example N,N'-N''-tri-(3,4-dichlorobenzyl)-guanidine hydrochloride inhibited the growth of organisms as follows: Staph. pyogenes (penicillin sensitive) (1:2,560,000), Staph. pyogenes (penicillin resistant) (1:5,120,000), Sarcina lutea (1:20,480,000), Strept. faecalis (1:20,480,000), E coli No. 198 (1:640,000), Aero. aerogenes (1:160,000), S. pullorum (1:160,000), Ps. aeruginosa (1:80,000), Pr. mirabilis (1:160,000) and Pr. vulgaris (1:160,000).

The production of a trisubstituted guanidine of the foregoing general formula comprises reacting an N,N'-disubstituted thiourea of the general formula:

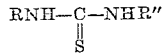

with an S-alkylating agent, for example methyl iodide, and reacting the product with an amine R'NH$_2$. Where the alkylating agent is an alkyl iodide the product is then obtained as the hydroiodide salt. The hydroiodide salt may be converted to the free guanidine by treatment with alkali and the free base may then be converted to a desired salt. Alternatively the hydroiodide salt may be converted to the free guanidine or to a desired salt by passing a methanolic solution of the hydroiodide compound through a column of Amberlite IRA–400 ion-exchange resin in chloride form.

Guanidine derivatives of the foregoing general formula in which the three substituents are identical may be prepared by reacting benzylamine with trichloromethane-sulphenyl chloride in an inert solvent such as petroleum ether. The resulting trichloromethanesulphenamide is condensed, in the presence of an inert solvent such as petroleum ether, to yield trisubstituted guanidine as a hydrochloride salt.

According to a further feature of this invention there are provided bacteriostatic compositions comprising a trisubstituted guanidine of the foregoing general formula compounded in minor amount with a major amount of a carrier. The word "carrier" is used in a general sense to denote an acceptable substance or substances physically compounded with the active agent to assist the active substance in effecting contact with bacteria and thus to form a product which can be used practically as a bacteriostatic agent. The composition may also contain other active constituents. The active substances of the invention are used preferably in the form of tablets for internal use and in the form of an ointment or salve for external application.

Thus, for example, one effective composition is a tablet made by mixing the active substance with a dry carrier made up of a filler, for example starch or milk sugar or both, and a lubricating agent, for example, talc or stearic acid or both. These constituents are thoroughly mixed and then compressed into slugs, the slugs being subsequently ground and screened to provide granules. The granules are compressed into tablets. A conveniently effective concentration of the active substance in a tablet is generally from about 25 mg. to about 300 mg. per tablet.

A salve or ointment may be made, for example, by incorporating 2 to 10% by weight of the active substance in a water-miscible greaseless base ointment as a carrier, and mixing the product in a roller type ointment mill. This ointment can be used for topical applications in the treatment of infected skin areas.

The products of this invention are also useful as industrial preservatives or general disinfectants.

The following examples will serve to illustrate the invention:

EXAMPLE I

*N,N',N''Tri-(3,4-Dichlorobenzyl)-Guanidine Hydrochloride*

Trichloromethanesulphenylchloride (1.86 parts) was added dropwise to a solution of 3,4-dichlorobenzylamine in petroleum ether (80 parts) at 30–35°. When the addition was complete an additional portion of 3,4-dichlorobenzylamine (7.0 parts) was added and the mixture was heated under reflux for 9 hours. The suspension was cooled and filtered following which the precipitate (11.9 parts) was extracted successively with 5% hydrochloric (200 parts) and boiling chloroform. The insoluble residue was crystallized from ethanol to give pure N,N',N''-tri - (3,4 - dichlorobenzyl) - guanidine hydrochloride, M.P.=223–225°, yield 1.6 parts (27.9% of theory).

Analysis.—Percent calculated for C$_{22}$H$_{18}$Cl$_7$N$_3$: C, 46.14; H, 3.17; Cl, 43.35; N, 7.34. Found: C, 46.11; H, 2.90; Cl, 43.70; N, 7.32.

EXAMPLE II

*N,N',N''-Tri-(3,4-Dichlorobenzyl)-Guanidine*

1,3-di-(3,4-dichlorobenzyl)-thiourea (129 parts) was added to methyl iodide (79 parts) in ethanol (130 parts) and the solution was heated under reflux for one hour. The solution was evaporated in vacuo, and the residue was crystallized from ether. The precipitate of N,N'-di-(3,4-dichlorobenzyl) - S - methylpseudothiourea hydroiodide, M.P. 150–153° C., was recovered by filtration, yield 181 parts (100% of theory). A sample of the hydroiodide salt (2 parts) was dissolved in methanol (80 parts), and the solution was passed through a column of Amberlite IRA–400 (25 parts) in the chloride form. The column was washed with methanol (80 parts), and the combined effluents were evaporated to dryness. Crystallization of the residue from ethanol and ether gave N,N'-di-(3,4-dichlorobenzyl) - S-methylpseudothiourea hydrochloride, M.P. 175–176°, yield 1.4 parts (85% of theory).

*Analysis.*—Percent calculated for $C_{16}H_{15}Cl_5N_2S$: C, 43.22; H, 3.40; Cl, 39.87; N, 6.30; S, 7.21. Found: C, 43.28; H, 3.49; Cl, 39.59; N, 6.55; S, 7.19.

N,N' - di-(3,4-dichlorobenzyl)-S-methylpseudothiourea hydroiodide (21.5 parts) and dichlorobenzylamine (8 parts) were heated at 100° for 1.5 hours. The mixture was cooled and triturated with ether (80 parts), giving a precipitate of N,N',N''-tri-(3,4-dichlorobenzyl)-guanidine hydroiodide, M.P. 226–227°, yield 26.6 parts (100% of theory). Crystallization from ethanol and ether raised the melting point to 229–230°.

*Analysis.*—Percent calculated for $C_{22}H_{18}Cl_6N_3$: C, 39.79; H, 2.73; halogen, 51.14; N, 6.33. Found: C, 40.05; H, 3.10; halogen, 50.68; N, 6.45.

A sample of the hydroiodide salt (26.6 parts) was dissolved in methanol (100 parts) and a solution of sodium hydroxide (2.5 parts) in water (25 parts) was added. Dilution with water (200 parts) gave a precipitate of N,N',N''-tri-(3,4-dichlorobenzyl)-guanidine, M.P. 104–105°, yield 20.8 parts (97% of theory).

*Analysis.*—Percent calculated for $C_{22}H_{17}Cl_6N_3$: C, 49.28; H, 3.20; Cl, 39.67; N, 7.84. Found: C, 49.45; H, 3.30; Cl, 39.65; N, 7.95. A solution of the free base (5.4 parts) in ether (80 parts) was shaken with 10% hydrochloric acid (50 parts) causing the precipitation of N,N',N'' - tri-(3,4-dichlorobenzyl)-guanidine hydrochloride, M.P. 223.5–225.5°, yield 4.75 parts (83% of theory).

There was no depression of the melting point on admixture with a sample prepared as in Example I.

EXAMPLE III

*N,N'-Di-(3,4-Dichlorobenzyl)-N''-Benzylguanidine*

Benzylamine (12 parts) was added to N,N'-di-(3,4-dichlorobenzyl)-S-methylpseudothiourea hydroiodide (54 parts) in ethanol (80 parts) and the solution was refluxed for 2 hours. The solution was cooled and the precipitate of N,N'-di-(3,4-dichlorobenzyl)-N''-benzylguanidine hydroiodide was filtered, M.P. 165–170°, yield 43.8 parts (81.8% of theory). Crystallization from ethanol raised the melting point to 177–178°.

*Analysis.*—Percent calculated for $C_{22}H_{20}Cl_4IN_3$: C, 44.39; H, 3.39; halogen, 45.16; N, 7.06. Found: C, 44.63; H, 3.47; halogen 44.73; N, 7.08.

A sample of the hydroiodide salt (38 parts) was dissolved in methanol (160 parts) and sodium hydroxide (4 parts) in water (30 parts) was added. The solution was concentrated in vacuo and the residue was dissolved in ether (200 parts). The ether solution was washed with water (3 x 100 parts) and was then shaken with 10% hydrochloric acid (100 parts). The precipitate was filtered and crystallized from ethanol and water giving N,N'-di-(3,4-dichlorobenzyl)-N''-benzylguanidine hydrochloride, M.P. 182–183°, yield 20 parts (64% of theory).

*Analysis.*—Percent calculated for $C_{22}H_{20}Cl_5N_3$: C, 52.46; H, 4.00; Cl, 35.20; H, 8.34. Found: C, 52.37; N, 4.01; Cl, 35.07; N, 8.41.

EXAMPLE IV

*N,N'-Di-(3,4-Dichlorobenzyl)-N''-Methylguanidine*

Methylamine (25% aqueous solution, 20 parts) was added to N,N'-di-(3,4-dichlorobenzyl)-S-methylpseudothiourea hydroiodide (9 parts) in ethanol (20 parts). After being allowed to stand for 11 days, the solution was evaporated and the residue was crystallized from ethanol and ether giving N,N''-di-(3,4-dichlorobenzyl)-N''-methylguanidine hydroiodide, M.P. 198–200°, yield 6.2 parts (71% of theory).

*Analysis.*—Percent calculated for $C_{16}H_{16}Cl_4IN_3$: C, 37.02; H, 3.11; halogen, 51.76; N, 8.10. Found: C, 37.22; H, 3.48; halogen, 51.59; N, 8.05.

The hydroiodide salt (5.8 parts) was dissolved in ethanol (80 parts) and sodium hydroxide (0.5 part) in water (20 parts) was added. The solution was evaporated in vacuo and the residue was extracted with ether (80 parts). The ether layer was acidified with anhydrous hydrogen chloride, and the precipitate was crystallized from ethanol and ether, giving N,N'-di-(3,4-dichlorobenzyl)-N''-methylguanidine hydrochloride, M.P. 98–100° (dec.), yield 4.1 parts (85.6% of theory). The product crystallized with one mole equivalent of ethanol.

*Analysis.*—Percent calculated for $$C_{16}H_{16}Cl_5N_3 \cdot C_2H_5OH$$

C, 45.64; H, 4.68; Cl, 37.43; N, 8.87. Found: C, 45.73; H, 4.70; Cl, 37.70; H, 9.21.

EXAMPLE V

*N,N'-Di-(3,4-Dichlorobenzyl)-N''-(2-Hydroxyethyl)-Guanidine*

Ethanolamine (2.3 parts) was treated with N,N'-di-(3,4-dichlorobenzyl) - S - methylpseudothiourea hydroiodide (10 parts) in ethanol (8 parts) for 6 days at room temperature. The solution was evaporated and the residue was crystallized from ethanol and ether, giving N,N'-di-(3,4-dichlorobenzyl)-N''-(2-hydroxyethyl) guanidine hydroiodide, M.P. 158–159°, yield 2.9 parts (28.3% of theory).

*Analysis.*—Percent calculated for $C_{17}H_{18}Cl_4IN_3O$: C, 37.18; H, 3.30; halogen, 48.93; N, 7.65. Found: C, 37.43; H, 3.53; halogen, 48.69; N, 7.49.

The hydroiodide salt (4 parts) in ethanol (80 parts) was passed through a column of Amberlite IRA-400 in the chloride form (35 parts), and the column was washed with additional ethanol (80 parts). Evaporation of the effluent gave the hydrochloride salt, M.P. 118–119°, yield 3.3 parts (99% of theory). The product crystallized with one mole equivalent of water.

*Analysis.*—Percent calculated for $C_{17}H_{18}Cl_5N_3O \cdot H_2O$: C, 42.93; H, 4.28; Cl, 37.28; H, 8.84. Found. C, 43.35; H, 4.10; Cl, 37.35; N, 8.42.

EXAMPLE VI

*N,N'-Di-(3,4-Dichlorobenzyl)-N''-n-Propylguanidine* n-Propylamine was treated with N,N'-di-(3,4-dichlorobenzyl)-S-methylpseudothiourea hydroiodide as described in Example V. Crystallization from ethanol and ether gave N,N'-di-(3,4-dichlorobenzyl)-N''-n-propylguanidine hydroiodide, M.P. 149–150°, yield 79% of theory.

*Analysis.*—Percent calculated for $C_{18}H_{20}Cl_3IN$: C, 39.52; H, 3.69; halogen, 49.12; N, 7.68. Found: C, 39.58; H, 3.92; halogen, 49.04; N, 7.76.

The hydroiodide salt was converted to the hydrochloride salt, M.P. 102–105°, in 96% yield as described in Example V.

*Analysis.*—Percent calculated for $C_{18}H_{20}Cl_5N_3$: C, 47.46; H, 4.43; Cl, 38.91; N, 9.22. Found: C, 47.03; H, 4.65; Cl, 38.88; N, 9.15.

EXAMPLE VII

*N,N'-Di-(3,4-Dichlorobenzyl)-N''-n-Butylguanidine* n-Butylamine was treated with N,N'-di-(3,4-dichlorobenzyl)-S-methylpseudothiourea hydroiodide as described in Example V. Crystallization from ethanol and water gave N,N'-di-(3,4 - dichlorobenzyl)-N''-n-butylguanidine hydroiodide, M.P. 112–114°, yield 92.5% of theory.

*Analysis.*—Percent calculated for $C_{19}H_{22}Cl_4IN_3$: C, 40.67; H, 3.95; halogen, 47.88; N, 7.49. Found: C, 40.82; H, 4.14; halogen, 48.11; N, 7.53.

The hydroiodide salt was converted to the hydrochloride salt as described in Example V, M.P. 94–96°.

*Analysis.*—Percent calculated for $C_{19}H_{22}Cl_5N_3$: C, 48.59; H, 4.72; Cl, 37.75; N, 8.92. Found: C, 48.13; H, 4.73; Cl, 38.10; N, 8.92.

EXAMPLE VIII

*N,N'-Di-(3,4-Dichlorobenzyl)-N''-Octylguanidine* n-Octylamine (0.52 part) and N,N'-di-(3,4-dichlorobenzyl)-S-methylpseudothiourea hydroiodide (2.08 parts) were heated at 70° for one hour. The mixture was cooled and triturated with ether (40 parts) and the precipitate was crystallized from ethanol and water giving N,N'-di-(3,4 - dichlorobenzyl) - N''-n-octylguanidine hydroiodide, M.P. 131–132°, yield 1.04 parts (43.5% of theory).

*Analysis.*—Percent calculated for $C_{23}H_{31}Cl_4IN_3$: C, 44.75; H, 4.90; halogen, 43.54; N, 6.81. Found: C, 44.85; H, 5.03; halogen, 43.14; N, 7.13.

The hydroiodide salt was converted to the hydrochloride salt as described in Example V, M.P. 129–130°, yield 48% of theory.

*Analysis.*—Percent calculated for $C_{23}H_{31}Cl_5N_3$: C, 52.53; N, 5.89; Cl, 33.72; N, 7.99. Found: C, 52.54; H, 5.94; Cl, 33.24; N, 8.48.

EXAMPLE IX

*N,N'-Di-(3,4-Dichlorobenzyl)-N''-n-Dodecylguanidine* n-Dodecylamine (9.5 parts) and N,N'-di-(3,4-dichlorobenzyl)-S-methylpseudothiourea hydroiodide (26.8 parts) were heated at 140° for 2 hours. The mixture was cooled and triturated with ether and the precipitate was crystallized from ethanol and ether giving N,N'-di-(3,4-dichlorobenzyl)-N''-n-dodecylguanidine hydroiodide, M.P. 135–136°, yield 12.8 parts (38% of theory).

The hydroiodide salt was converted to the hydrochloride salt as described in Example V, M.P. 121–123°, yield 98.5% of theory.

*Analysis.*—Percent calculated for $C_{27}H_{38}Cl_5N_3$: C, 55.71; H, 6.58; Cl, 30.46; N, 7.22. Found: C, 55.45; H, 6.71; Cl, 30.64; N, 7.46.

EXAMPLE X

*N,N'-Di-(3,4-Dichlorobenzyl)-N''-(3-Pyridylmethyl)-Guanidine*

3-aminomethylpyridine (0.81 part) and N,N'-di-(3,4-dichlorobenzyl)-S-methylpseudothiourea hydroiodide (4.0 parts) were heated in amylalcohol (3 parts) at 120° for 3 hours. Addition of ether (40 parts) gave N,N'-di-(3,4-dichlorobenzyl) - N'' - (3-pyridylmethyl)-guanidine hydroiodide, M.P. 105–115°.

The hydroiodide salt was converted to the dihydrochloride salt, M.P. 207–215°, yield 3.1 parts (76% of theory overall), as described in Example V.

*Analysis.*—Percent calculated for $C_{21}H_{20}Cl_6N_4$: C, 46.60; H, 3.72; Cl, 39.30; N, 10.38. Found: C, 46.60; H, 4.02; Cl, 39.05; N, 10.41.

EXAMPLE XI

*N,N'-Di-(3,4-Dichlorobenzyl)-N''-Pyridylmethyl-Guanidine*

2-aminomethylpyridine was treated with N,N'-di-(3,4-dichlorobenzyl)-S-methylpseudothiourea hydroiodide as described in Example X. The amorphous hydroiodide was converted as in Example V to N,N'-di-(3,4-dichlorobenzyl) - N'' - (2-pyridylmethyl)-guanidine dihydrochloride, M.P. 185–195°, yield 78% of theory (overall). The melting point was unaffected by recrystallization from ethanol.

*Analysis.*—Percent calculated for $C_{21}H_{20}Cl_6N_4$: C, 46.60; H, 3.72; Cl, 39.30; N, 10.38. Found: C, 46.50; H, 3.86; Cl, 39.30; N, 10.66.

EXAMPLE XII

*N,N'-Di-(3,4-Dichlorobenzyl)-N''-(2-Phenylethyl)-Guanidine*

2-phenylethylamine (4.0 parts) and N,N'-di-(3,4-dichlorobenzyl)-S-methylpseudothiourea hydroiodide (17.9 parts) were dissolved in n-butanol and the solution was refluxed for 5 hours. The solution was evaporated to dryness and the residue was crystallized from ethanol and ether. The precipitate (13 parts) in methanol (200 parts) was passed through a column of Amberlite IR–120 in the acid form. The column was washed with methanol (400 parts) and the effluent, containing 1,3-di-(3,4-dichlorobenzyl)-urea, M.P. 189–190°, was discarded. The column was then washed with 5% methanolic hydrogen chloride (500 parts). Evaporation of the acidic effluent gave N,N'-di-(3,4-dichlorobenzyl)-N''-(2-phenylethyl)-guanidine hydrochloride, M.P. 129–130°, yield 7.9 parts (44.6% of theory overall).

*Analysis.*—Percent calculated for $C_{23}H_{22}Cl_5N_3$: C, 53.36; H, 4.29; Cl, 34.22; N, 8.12. Found: C, 53.23; H, 4.23; Cl, 34.19; N, 8.19.

EXAMPLE XIII

*N,N'-Di-(3,4-Dichlorobenzyl)-N''-(2-Dimethylaminoethyl)-Guanidine*

N,N-dimethylethylenediamine was treated with N,N'-di-(3,4-dichlorobenzyl)-S-methylpseudothiourea hydroiodide as in Example V. The solution was evaporated and the residue was crystallized from ethanol and ether giving N,N'-di-(3,4-dichlorobenzyl)-N''-(2-dimethylaminoethyl)-guanidine hydroiodide, M.P. 124–125°, yield 5.31 parts (94.4% of theory).

*Analysis.*—Percent calculated for $C_{19}H_{23}Cl_4IN_4$: C, 39.61; H, 4.02; halogen, 46.64; N, 9.72. Found: C, 39.61; H, 4.17; halogen, 46.39; N, 9.92.

The hydroiodide salt was converted to the amorphous hydrochloride salt as in Example V.

EXAMPLE XIV

*N,N'-Di-(3,4-Dichlorobenzyl)-N''-(2,4,5-Trimethylbenzyl)-Guanidine*

2,4,5-trimethylbenzylamine (1.49 parts) was added to N,N'-(3,4-dichlorobenzyl)-S-methylpseudothiourea hydroiodide (5.36 parts) in ethanol (10 parts) and the solution was allowed to stand for 6 days. Concentration of the solution resulted in the precipitation of N,N'-di-(3,4 - dichlorobenzyl) - N''-(2,4,5-trimethylbenzyl)-guanidine hydroiodide, M.P. 208–210°, yield 4.70 parts (73.7% of theory).

*Analysis.*—Percent calculated for $C_{25}H_{26}Cl_4IN_3$: C, 47.11; H, 4.11; halogen, 42.17; N, 6.59. Found: C, 47.25; H, 4.23; halogen, 43.29; N, 6.50.

The hydroiodide salt was converted to the hydrochloride salt, M.P. 232–233°, yield 96.4% of theory, as described in Example III.

*Analysis.*—Percent calculated for $C_{25}H_{26}Cl_5N_3$: C, 55.01; H, 4.80; Cl, 32.49; N, 7.70. Found: C, 55.26; H, 4.98; Cl, 32.30; N, 7.59.

EXAMPLE XV

*N,N'-Di-(3,4-Dichlorobenzyl)-N''-(4-Isopropylbenzyl)-Guanidine*

4-isopropylbenzylamine was treated with N,N'-di-(3,4-dichlorobenzyl)-S-methylpseudothiourea hydroiodide as described in Example XIV. N,N'-di-(3,4-dichlorobenzyl)-N''-(4-isopropylbenzyl)-guanidine hydroiodide, M.P. 178–179°, was isolated in 72.4% yield.

*Analysis.*—Percent calculated for $C_{25}H_{26}Cl_4IN_3$: C, 47.11; H, 4.11; halogen, 42.17; N, 6.59. Found: C, 46.97; H, 4.10; halogen, 42.07; N, 6.53.

The hydrochloride salt, prepared as in Example III in 74.1% yield, melted at 178–180°.

*Analysis.*—Percent calculated for $C_{25}H_{26}Cl_5N_3$: C, 55.01; H, 4.80; Cl, 32.49; N, 7.70. Found: C, 54.82; H, 4.81; Cl, 32.51; N, 7.59.

EXAMPLE XVI

N,N'-Di-(3,4-Dichlorobenzyl)-N''-Allylguanidine

Allylamine (2.86 parts) was heated with N,N'-di-(3,4-dichlorobenzyl) - S-methylpseudothiourea hydroiodide (26.81 parts) at 60° for 2 hours. Crystallization of the residue from ethanol gave N,N'-di-(3,4-dichlorobenzyl)-N''-allylguanidine hydroiodide, M.P. 139–140°, yield 11.0 parts (40% of theory).

Analysis.—Percent calculated for $C_{18}H_{18}Cl_4IN_3$: C, 39.66; H, 3.33; halogen, 49.28; N, 7.71. Found: C, 39.78; H, 3.21; halogen, 48.96; N, 7.45.

The hydroiodide salt was converted to the hydrochloride salt, M.P. 95–97° (96% of theory) as in Example III.

EXAMPLE XVII

N,N'-Di-(3,4-Dichlorobenzyl)-N''-(α-Naphthylmethyl)-Guanidine

α-Naphthylmethylamine (3.3 parts) was heated with N,N'-di-(3,4-dichlorobenzyl)-S-methylpseudothiourea hydroiodide (10.72 parts) at 100° for 1 hour. The cooled mixture was crystallized from aqueous dimethylformamide giving N,N'-di-(3,4-dichlorobenzyl)-N''-(α-napthylmethyl)-guanidine hydroiodide, M.P. 226–227°, yield 9.34 parts (72.5% of theory).

Analysis.—Percent calculated for $C_{26}H_{22}Cl_4IN_3$: C, 48.41; H, 3.44; halogen, 41.65; N, 6.51. Found: C, 48.45; H, 3.68; halogen, 41.36; N, 6.38.

The hydroiodide salt was converted to the hydrochloride salt as in Example III, M.P. 209–210°, yield 99% of theory. The product crystallized with one mole equivalent of water.

Analysis.—Percent calculated for $C_{26}H_{22}Cl_5N_3 \cdot H_2O$: C, 54.62; H, 4.23; Cl, 31.01; H, 7.35. Found: C, 54.69; H, 3.97; Cl, 31.40; N, 7.43.

EXAMPLE XVIII

N-3,4-(Dichlorobenzyl)-N',N''-Dibenzylguanidine 3,4-dichlorobenzylamine (4.32 parts) and N,N'-dibenzyl-S-methylpseudothiourea hydroiodide (10.0 parts) were refluxed in butanol (20 parts) for 1 hour. The cooled solution was diluted with ether to give N,N'-dibenzyl-N''-(3,4-dichlorobenzyl) - guanidine hydroiodide, M.P. 183–184°, yield 13.0 parts (98.5% of theory).

Analysis.—Percent calculated for $C_{22}H_{22}Cl_2IN_3$: C, 50.21; H, 4.21; halogen, 37.58; N, 7.99. Found: C, 50.52; H, 4.38; halogen, 37.57; N, 7.85.

The hydrochloride salt, M.P. 188–189°, was prepared as in Example III in 96.6% yield.

Analysis.—Percent calculated for $C_{22}H_{22}Cl_3N_3$: C, 60.76; H, 5.10; Cl, 24.46; N, 9.71. Found: C, 60.54; H, 5.02; Cl, 24.80; N, 9.47.

EXAMPLE XIX

N,N',N''-Tri-(4-Methylbenzyl)-Guanidine 4-methylbenzylamine (121 parts) was added to carbon disulphide (38.8 parts) in ethanol (400 parts) and the solution was refluxed for 22 hours. The solution was evaporated and the residue was crystallized from ethanol giving 1,3-di-(4-methylbenzyl)-thiourea, M.P. 135–136°, yield 142 parts (100% of theory).

Analysis.—Percent calculated for $C_{17}H_{20}N_2S$: C, 71.80; H, 7.09; N, 9.85; S, 11.28. Found: C, 72.02; H, 7.33; N, 9.81; S, 11.26.

1,3-di-(4-methylbenzyl)-thiourea (28.4 parts) was added to methyl iodide (28.4 parts) in ethanol (40 parts) and the solution was refluxed for 1 hour. Evaporation of the solution gave a quantitative yield of N,N''-di-(4-methylbenzyl)-S-methylpseudothiourea hydroiodide, M.P. 129–130°.

Analysis.—Percent calculated for $C_{18}H_{23}IN_2S$: C, 50.70; H, 5.44; I, 29.76; N, 6.57; S, 7.52. Found: C, 50.81; H, 5.39; I, 29.74; N, 6.58; S, 7.57.

4-methylbenzylamine (12.1 parts) was added to N,N'-di-(4-methylbenzyl)-S-methylpseudothiourea hydroiodide (42.6 parts) in ethanol (70 parts) and the solution was refluxed for 1 hour. The solution was cooled and diluted with ether giving N,N',N''-tri-(4-methylbenzyl)-guanidine hydroiodide, M.P. 208–209°, yield 41.2 parts (82.6% of theory).

Analysis.—Percent calculated for $C_{25}H_{30}IN_3$: C, 60.12; H, 6.05; I, 25.41; N, 8.42. Found: C, 60.16; H, 6.03; I, 25.49; N, 8.60.

The hydroiodide salt was converted to the hydrochloride salt, M.P. 237–238°, in 94.5% yield by treatment with Amberlite IRA-400 in the chloride form as described in Example V.

Analysis.—Percent calculated for $C_{25}H_{30}ClN_3$: C, 73.59; H, 7.41; Cl, 8.69; N, 10.30. Found: C, 73.56; H, 7.53; Cl, 8.81; N, 10.12.

A solution of the hydrochloride salt (0.82 part) in ethanol (80 parts) was made basic with 5% aqueous sodium hydroxide solution (10 parts). The solution was diluted with water (100 parts) and the precipitate was crystallized from ethanol and water to give N,N',N''-tri-(4-methylbenzyl)-guanidine, M.P. 88–88.5°, yield 0.71 part (95.5% of theory).

Analysis.—Percent calculated for $C_{25}H_{29}N_3$: C, 80.82; H, 7.87; N, 11.31. Found: C, 80.64; H, 7.97; N, 11.33.

EXAMPLE XX

N,N'N''-Tri-[β-(3,4-Dichlorophenyl)-Ethyl]-Guanidine

β-(3-,4-dichlorophenyl)-ethylamine was converted to 1,3-di-[β-(3,4-dichlorophenyl)-ethyl]-thiourea, M.P. 124–125° (82.2% of theory) as in Example XIX.

Analysis.—Percent calculated for $C_{17}H_{16}Cl_4N_2S$: C. 48.36; H, 3.82; Cl, 33.86; N, 6.64; S, 7.59. Found: C, 48.54; H, 3.96; Cl, 33.60; N, 6.82; S, 7.58.

The thiourea was treated with methyl iodide as in Example XIX to give N,N'-di-[β-(3,4-dichlorophenyl)-ethyl] - pseudothiourea hydroiodide, M.P. 125–126°, 95.2% of theory.

Analysis.—Percent calculated for $C_{18}H_{19}Cl_4IN_2S$: C, 38.33; H, 3.40; halogen, 47.64; N, 4.97; S, 5.68. Found: C, 38.65; H, 3.44; halogen, 47.54; N, 4.86; S, 5.76.

β-(3,4-dichlorophenyl)-ethylamine was treated with N,N'-di-[β-(3,4-dichlorophenyl) - ethyl] - pseudothiourea hydroiodide as in Example XIX to give N,N',N''-tri-[β-(3,4-dichlorophenyl)-ethyl]-guanidine hydroiodide, M.P. 140–141°, 78.1% of theory.

Analysis.—Percent calculated for $C_{25}H_{24}Cl_6IN_3$: C. 42.52; H, 3.43; halogen, 48.09; H, 5.95. Found: C, 42.66; H, 3.43; halogen, 47.76; N, 6.17.

The hydroiodide salt was converted to the hydrochloride salt, M.P. 114–115° (97.6% of theory) as in Example III.

Analysis.—Percent calculated for $C_{25}H_{24}Cl_7N_3$: C, 48.83; H, 3.94; Cl, 40.37; N, 6.84. Found: C, 48.88; H, 4.27; Cl, 39.87; N, 6.92.

EXAMPLE XXI

N,N',N''-Tri-(3,4-Dimethylbenzyl)-Guanidine 3,4-dimethylbenzylamine was converted to 1,3-di(3,4-dimethylbenzyl)-thiourea as described in Example XIX, M.P. 98–99°, yield 99.4% of theory.

Analysis.—Percent calculated for $C_{19}H_{24}N_2S$: C, 73.03; H, 7.74; N, 8.97; S, 10.26. Found: C, 72.87; H, 7.66; N, 8.78; S, 10.26.

The thiourea was converted as in Example XIX to N,N'-di-(3,4-dimethylbenzyl) - S - methylpseudothiourea hydroiodide, M.P. 120–120.5°, yield quantitative.

Analysis.—Percent calculated for $C_{20}H_{27}IN_2S$: C, 52.86; H, 5.99; I, 27.93; N, 6.17; S, 7.06. Found: C, 52.64; H, 6.06; I, 27.95; N, 6.00; S, 6.99.

3,4-dimethylbenzylamine was treated with N,N'-di-(3,4 - dimethylbenzyl)-S-methylpseudothiourea hydroiodide as in Example XIX giving N,N',N''-tri-(3,4-dimethylbenzyl)-guanidine hydroiodide, M.P. 182–184°, yield 77.8% of theory.

Analysis.—Percent calculated for $C_{28}H_{36}IN_3$: C, 62.10; H, 6.70; I, 23.43; N, 7.76. Found: C, 62.21; H, 6.68; I, 23.35; N, 7.63.

The hydroiodide salt was converted to the hydrochloride salt as in Example V, M.P. 215–216°, yield 95.2% of theory.

Analysis.—Percent calculated for $C_{28}H_{36}ClN_3$: C, 74.73; H, 8.06; Cl, 7.88; N, 9.34. Found: C, 74.34; H, 7.97; Cl, 7.98; N, 9.25.

EXAMPLE XXII

N,N'-Di-(3,4-Dimethylbenzyl)-N''-(n-Butyl)-Guanidine n-Butylamine was treated with N,N'-di-(3,4-dimethylbenzyl)-S-methylpseudothiourea hydroiodide as in Example XIX. N,N'-di-(3,4-dimethylbenzyl)-N'',(n-butyl)-guanidine hydroiodide, M.P. 102–104°, was isolated in 68% yield.

Analysis.—Percent calculated for $C_{23}H_{34}IN_3$: C, 57.61; H, 7.15; I, 26.47; N, 8.77. Found: C, 57.60; H, 7.27; I, 26.48; N, 8.96.

The amorphous hydrochloride salt was prepared from the hydroiodide salt as in Example V.

EXAMPLE XXIII

N-(3,4-Dichlorobenzyl)-N'-N''-di-(α-Naphthylmethyl)-Guanidine

α-Naphthylmethylamine was converted to 1,3-di-(α-naphthylmethyl)-thiourea as in Example XIX, M.P. 168–169°, yield 59.2% of theory.

Analysis.—Percent calculated for $C_{23}H_{20}N_2S$: C, 77.48; H, 5.65; N, 7.86; S, 8.99. Found: C, 77.34; H, 5.62; N, 7.35; S, 8.60.

The thiourea was converted as in Example XIX to N,N'-di-(α-napthylmethyl)-S-methylpseudothiourea hydroiodide, M.P. 113–115° (dec.), yield quantitative. The product crystallized with one mole equivalent of ethanol.

Analysis.—Percent calculated for $C_{24}H_{23}IN_2S \cdot C_2H_5OH$: C, 57.36; H, 5.37; I, 23.30; N, 5.15; S. 5.89. Found: C, 57.04; H, 5.36; I, 23.03; N, 4.94; S, 5.78.

3,4-dichlorobenzylamine (0.88 part) was heated with N,N'-di-(α-naphthylmethyl)-S-methylpseudothiourea hydroiodide (2.49 parts) at 120° for 1 hour. Crystallization from ethanol gave N-(3,4-dichlorobenzyl)-N'-N''-di-(α-naphthylmethyl)-guanidine hydroiodide, M.P. 199–201°, yield 2.95 parts (94.2% of theory).

The hydroiodide salt was converted to the hydrochloride salt, M.P. 240–241°, (98.4% of theory) as in Example III.

Analysis.—Percent calculated for $C_{30}H_{26}Cl_3N_3$: C, 67.36; H, 4.90; Cl, 19.89; N, 7.86. Found: C, 67.29; H, 5.06; Cl, 19.54; N, 7.48.

EXAMPLE XXIV

N-(3,4-Dichlorobenzyl)-N'-(Benzyl)-N''-(3-Nitrobenzyl)-Guanidine 3,4-dichlorobenzyl isothiocyanate (4.51 parts) in ethanol (20 parts) was added to 3-nitrobenzylamine hydrochloride (3.90 parts) and sodium hydroxide (0.83 part) in water (10 parts), and the solution was refluxed for 1 hour. The solution was concentrated in vacuo and water (80 parts) was added. The precipitate was crystallized from aqueous dimethylformamide to give 1-(3,4-dichlorobenzyl)-3-(3-nitrobenzyl)-thiourea, M.P. 105–107°, yield 7.36 parts (96.2% of theory).

Analysis.—Percent calculated for $C_{15}H_{15}Cl_2N_3O_2S$: C, 48.66; H, 3.54; Cl, 19.16; N, 11.35; S, 8.66. Found: C, 48.49; H, 3.83; Cl, 19.06; N, 11.13; S, 8.56.

1 - (3,4 - dichlorobenzyl) - 3 - (3 - nitrobenzyl) - thiourea (6.45 parts) was added to methyl iodide (2.84 parts) in ethanol (20 parts) and the solution was refluxed for 1 hour. The solution was evaporated to dryness and the residual oil was heated with benzylamine (2.14 parts) at 120° for 1 hour. The amorphous N-(3,4-dichlorobenzyl)-N'-(benyzl)-N''-(3-nitrobenzyl)-guanidine hydroiodide was converted to the corresponding hydrochloride salt which gave a single spot on a paper chromatogram.

EXAMPLE XXV

N,N'-Di-(3,4-Dichlorobenzyl)-N''-(3-Nitrobenzyl)-Guanidine 3-nitrobenzylamine was treated with N,N'-di-(3,4-dichlorobenzyl)-3-methylpseudothiourea hydroiodide as described in Example V. The amorphous hydroiodide salt of N,N' - di - (3,4 - dichlorobenzyl) - N'' - (3 - nitrobenzyl)-guanidine was converted to the hydrochloride salt as in Example III. The product, obtained as an amorphous solid in 56% yield, gave a single spot on a paper chromatogram.

We claim:

1. The compounds conforming to the general formula:

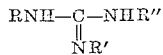

wherein R'' is one of a group consisting of straight chain alkyl group having from 1 to 12 carbon atoms, 2-hydroxyethyl, 2-dimethylaminoethyl, 2-phenylethyl, 2-pyridylmethyl, 3-pyridylmethyl, α-naphthylmethyl, allyl, benzyl, 3,4-dichlorobenzyl, 4-isopropylbenzyl, 2,4,5-trimethylbenzyl when R and R' are 3,4-dichlorobenzyl.

2. N,N',N''-tri-(3,4-dichlorobenzyl)-guanidine.

3. N,N'-di-(3,4-dichlorobenzyl)-N''-benzylguanidine.

4. N,N' - di - (3,4 -dichlorobenzyl) - N'' - n - dodecylguanidine.

5. N,N' - di - (3,4 - dichlorobenzyl) - N'' - (2 - phenylethyl)-guanidine.

6. N,N' - di - (3,4 - dichlorobenzyl) - N'' - (2 - dimethylaminoethyl)-guanidine.

7. N,N' - di - (3,4 - dichlorobenzyl) - N'' - (2,4,5 - trimethylbenzyl)-guanidine.

8. N,N' - di- (3,4 - dichlorobenzyl) - N'' - (4 - isopropylbenzyl)-guanidine.

9. N,N'-di-(3,4-dichlorobenzyl)-N''-allylguanidine.

10. N,N' - di - (3,4 - dichlorobenzyl) - N'' - (α-naphthylmethyl)-guanidine.

References Cited in the file of this patent

UNITED STATES PATENTS 2,338,627     Ericks et al. _____ Jan. 4, 1944

OTHER REFERENCES

Bly et al.: J.A.C.S., volume 44, pages 2896–2903 (1922).

Dyer et al.: J.A.C.S., volume 54, pages 777–787 (1932).

Connolly et al.: J. Chem. Soc. (London), volume of 1937, pages 827–828.

Dyson et al.: J. Chem. Soc. (London), volume of 1940, pages 191–194.

Ohazaki et al.: J. Pharm. Soc. Japan, volume 71, pages 501–502 (1951).